United States Patent
Imran et al.

(10) Patent No.: US 8,889,272 B2
(45) Date of Patent: Nov. 18, 2014

(54) COATED ARTICLE WITH LOW-E COATING INCLUDING TIN OXIDE INCLUSIVE LAYER(S) WITH ADDITIONAL METAL(S)

(71) Applicant: Guardian Industries Corp., Auburn Hills, MI (US)

(72) Inventors: Muhammad Imran, Brownstown, MI (US); Brent Boyce, Novi, MI (US); Jean-Marc Lemmer, Ann Arbor, MI (US); Marcus Frank, Ann Arbor, MI (US); Yongli Xu, Carleton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 103 days.

(21) Appl. No.: 13/680,517

(22) Filed: Nov. 19, 2012

(65) Prior Publication Data

US 2014/0141259 A1    May 22, 2014

(51) Int. Cl.
  *B32B 15/04*    (2006.01)
  *B32B 17/06*    (2006.01)
  *C03C 17/36*    (2006.01)
  *C03C 17/34*    (2006.01)

(52) U.S. Cl.
  CPC ......... *C03C 17/3429* (2013.01); *C03C 17/3681* (2013.01); *C03C 17/366* (2013.01); *C03C 17/3652* (2013.01); *C03C 17/3626* (2013.01); *C03C 17/3639* (2013.01); *C03C 17/3644* (2013.01)
  USPC ........... 428/701; 428/428; 428/432; 428/433; 428/434; 428/688; 428/689; 428/699; 428/702

(58) Field of Classification Search
  USPC ......... 428/428, 432, 433, 434, 688, 689, 699, 428/701, 702
  See application file for complete search history.

(56) References Cited

U.S. PATENT DOCUMENTS

| | | |
|---|---|---|
| 7,521,096 B2 | 4/2009 | Lemmer et al. |
| 7,597,965 B2 | 10/2009 | Blacker et al. |
| 7,648,769 B2 | 1/2010 | Blacker et al. |
| 7,771,830 B2 | 8/2010 | Neuman et al. |

(Continued)

FOREIGN PATENT DOCUMENTS

| | | |
|---|---|---|
| EP | 0 671 641 | 9/1995 |
| EP | 1 538 131 | 6/2005 |

(Continued)

OTHER PUBLICATIONS

U.S. Appl. No. 13/680,541, filed Nov. 19, 2012; Imran et al.

(Continued)

*Primary Examiner* — David Sample
*Assistant Examiner* — Lauren Colgan
(74) *Attorney, Agent, or Firm* — Nixon & Vanderhye P.C.

(57) ABSTRACT

A coated article includes a coating, such as a low emissivity (low-E) coating, supported by a substrate (e.g., glass substrate). The coating includes at least one dielectric layer including tin oxide that is doped with another metal(s). The coating may also include one or more infrared (IR) reflecting layer(s) of or including material such as silver or the like, for reflecting at least some IR radiation. In certain example embodiments, the coated article may be heat treated (e.g., thermally tempered, heat bent and/or heat strengthened). Coated articles according to certain example embodiments of this invention may be used in the context of windows, including monolithic windows for buildings, IG windows for buildings, etc.

28 Claims, 4 Drawing Sheets

(56) References Cited

U.S. PATENT DOCUMENTS

| | | |
|---|---|---|
| 7,858,191 B2 | 12/2010 | Lemmer et al. |
| 7,879,448 B2 | 2/2011 | Dietrich et al. |
| 8,017,243 B2 | 9/2011 | Blacker et al. |
| 8,101,278 B2 | 1/2012 | Laird |
| 8,142,622 B2 | 3/2012 | Ferreira et al. |
| 8,173,263 B2 | 5/2012 | Lingle et al. |
| 8,337,988 B2* | 12/2012 | Knoll et al. ............ 428/432 |
| 2005/0202254 A1* | 9/2005 | Nunez-Regueiro et al. .. 428/432 |
| 2007/0243391 A1 | 10/2007 | Varaprasad |
| 2007/0281171 A1* | 12/2007 | Coster et al. ............ 428/432 |
| 2009/0136765 A1* | 5/2009 | Maschwitz et al. ............ 428/432 |
| 2009/0214880 A1* | 8/2009 | Lemmer ............ 428/432 |
| 2010/0170696 A1 | 7/2010 | Yano et al. |
| 2010/0279144 A1 | 11/2010 | Frank et al. |
| 2010/0297413 A1* | 11/2010 | Hartig ............ 428/213 |
| 2011/0135955 A1* | 6/2011 | Maschwitz et al. ............ 428/623 |
| 2011/0261442 A1* | 10/2011 | Knoll et al. ............ 359/360 |
| 2011/0262726 A1 | 10/2011 | Knoll et al. |
| 2011/0268941 A1* | 11/2011 | Fischer et al. ............ 428/213 |
| 2012/0219821 A1* | 8/2012 | Frank et al. ............ 428/630 |
| 2012/0225224 A1* | 9/2012 | Blacker et al. ............ 428/34 |
| 2012/0225304 A1* | 9/2012 | Imran et al. ............ 428/433 |
| 2012/0225316 A1* | 9/2012 | Imran et al. ............ 428/623 |
| 2012/0225317 A1* | 9/2012 | Imran et al. ............ 428/630 |

FOREIGN PATENT DOCUMENTS

| | | |
|---|---|---|
| EP | 2 444 381 | 4/2012 |
| FR | 2 898 122 | 9/2007 |
| WO | WO 2013/104438 | 7/2013 |
| WO | WO 2013/104439 | 7/2013 |

OTHER PUBLICATIONS

International Search Report mailed Mar. 27, 2014.

* cited by examiner

COATED ARTICLE WITH LOW-E COATING INCLUDING TIN OXIDE INCLUSIVE LAYER(S) WITH ADDITIONAL METAL(S)

Example embodiments of this invention relates to a coated article including a coating, such as a low emissivity (low-E) coating, supported by a substrate (e.g., glass substrate). The coating includes at least one dielectric layer comprising tin oxide that is doped with another metal(s). The coating may also include one or more infrared (IR) reflecting layer(s) of or including material such as silver or the like, for reflecting at least some IR radiation. In certain example embodiments, the coated article may be heat treated (e.g., thermally tempered, heat bent and/or heat strengthened). Coated articles according to certain example embodiments of this invention may be used in the context of windows, including monolithic windows for buildings, IG windows for buildings, vehicle windows, and/or in any other suitable application.

BACKGROUND

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like. Heat treatment (HT) of coated articles typically requires use of temperature(s) of at least 580 degrees C., more preferably of at least about 600 degrees C. and still more preferably of at least 620 degrees C. Such high temperatures (e.g., for 5-10 minutes or more) often cause coatings to break down and/or deteriorate or change in an unpredictable manner. Thus, it is desirable for coatings to be able to withstand such heat treatments (e.g., thermal tempering), if desired, in a predictable manner that does not significantly damage the coating.

In certain situations, designers of coated articles strive for a combination of desirable visible transmission, desirable color, low emissivity (or emittance), and low sheet resistance ($R_S$). Low-emissivity (low-E) and/or low sheet resistance characteristics permit such coated articles to block significant amounts of IR radiation so as to reduce for example undesirable heating of vehicle or building interiors.

U.S. Pat. No. 7,521,096, incorporated herein by reference, discloses a low-E coating which uses zinc oxide (ZnO) contact layers below the silver-based IR reflecting layers, and above the bottom silver (Ag) based IR reflecting layer uses a $NiCrO_x$ contact layer followed by a center tin oxide ($SnO_2$) dielectric layer. The $SnO_2$ in the coating of the '096 patent has been found to show micro crystallization and stress upon HT which causes rough interfaces between the $SnO_2$, the ZnO and the Ag, which can lead to degradation of durability and affect transmitted color. The rough metal inclusive interfaces tend to initiate so called surface plasmons which result in selective absorption in a full layer stack especially in the lower visible spectral region (380-550 nm). This tends to cause one or more of unpredictable optical characteristics, less neutral color, lower visible transmission and/or lower LSG. Moreover, it has been found that the tin oxide (e.g., $SnO_2$) goes through significant change in crystallization and stress upon heating which tends to degrade the structure of ZnO and hence the Ag growth thereon. Again, this can lead to poor Ag quality and/or poor thermal stability of the coating such as undesirably high ΔE* values.

BRIEF SUMMARY OF EXAMPLE EMBODIMENTS

In view of the above, it will be apparent to those skilled in the art that there exists a need for coated articles having coatings (e.g., low-E coatings) with at least one dielectric layer that does not suffer from one or more of the above-identified problems with pure $SnO_2$ dielectric layers. In certain example embodiments, it has been found that including certain additional metal(s) in a tin oxide (e.g. $SnO_2$) inclusive dielectric layer can overcome one or more of the above-identified problems. For example, one or more of the following metal(s) can be added to tin oxide in sputter-depositing a dielectric layer in such a coating: Pd, Ag, Bi, In, Sb, Al, Mg, and/or Cu. Ternary and/or binary alloys (including oxides thereof) can be used to replace some of the tin in the oxide based layer(s) in order to make the dielectric layer and overall coating more thermally stable before and/or after optional heat treatment (HT), and reduce and/or slow stress change during the optional heat treatment process. The structure of the tin oxide inclusive dielectric layer, having the additional metal(s), is more chaotic and causes the layer and coating to be more stable. It has been found that the more chaotic the structure of the material is, the more stable it can be (e.g., upon HT). Such a tin oxide inclusive dielectric layer, with other metal(s) added thereto, may be used as a dielectric layer in any suitable low-E coating in certain example embodiments of this invention, such as between at least first and second IR reflecting layers, under IR reflecting layers, and/or over IR reflecting layers. However, not all dielectric layers in the coating need to be of such a material. In certain example embodiments, a tin oxide inclusive dielectric layer, with other metal(s) added thereto, may be used in a coating that also includes other dielectric layers of materials such as silicon nitride (e.g., $Si_3N_4$), $SnO_2$, ZnO, and/or the like.

In certain example embodiments of this invention, there is provided a coated article including a low-E coating on a glass substrate, the coating comprising: a first dielectric layer; first and second IR reflecting layers on the glass substrate and located over at least the first dielectric layer; and a second dielectric layer located between at least the first and second IR reflecting layers, wherein the second dielectric layer comprises an oxide of one or more of: SnPd, SnAg, SnMg, SnSb, SnZnBi, SnInZn, SnZnSb, SnZnAl, SnZnMg, SnCuSb, SnCuBi, SnBi, SnW, SnSbBi, SnZnCu, SnZnBiIn, and SnInGa.

In certain example embodiments of this invention, there is provided a coated article including a low-E coating on a glass substrate, the coating comprising: a dielectric layer and an IR reflecting layer on the glass substrate; and wherein the dielectric layer comprises an oxide of one or more of: SnPd, SnAg, SnMg, SnSb, SnZnBi, SnInZn, SnZnSb, SnZnAl, SnZnMg, SnCuSb, SnCuBi, SnBi, SnW, SnSbBi, SnZnCu, and SnInGa.

In certain example embodiments of this invention, there is provided a coated article including a low-E coating on a glass substrate, the coating comprising: a dielectric layer and an IR reflecting layer on the glass substrate; and wherein the dielectric layer comprises an oxide of one or more of: SnPd, SnAg, SnInZn, SnCuSb, SnCuBi, SnW, SnZnCu, SnZnBiIn, and SnInGa. The dielectric layer may be located over and/or under the IR reflecting layer.

DETAILED DESCRIPTION OF EXAMPLES OF THE INVENTION

Figure 1:
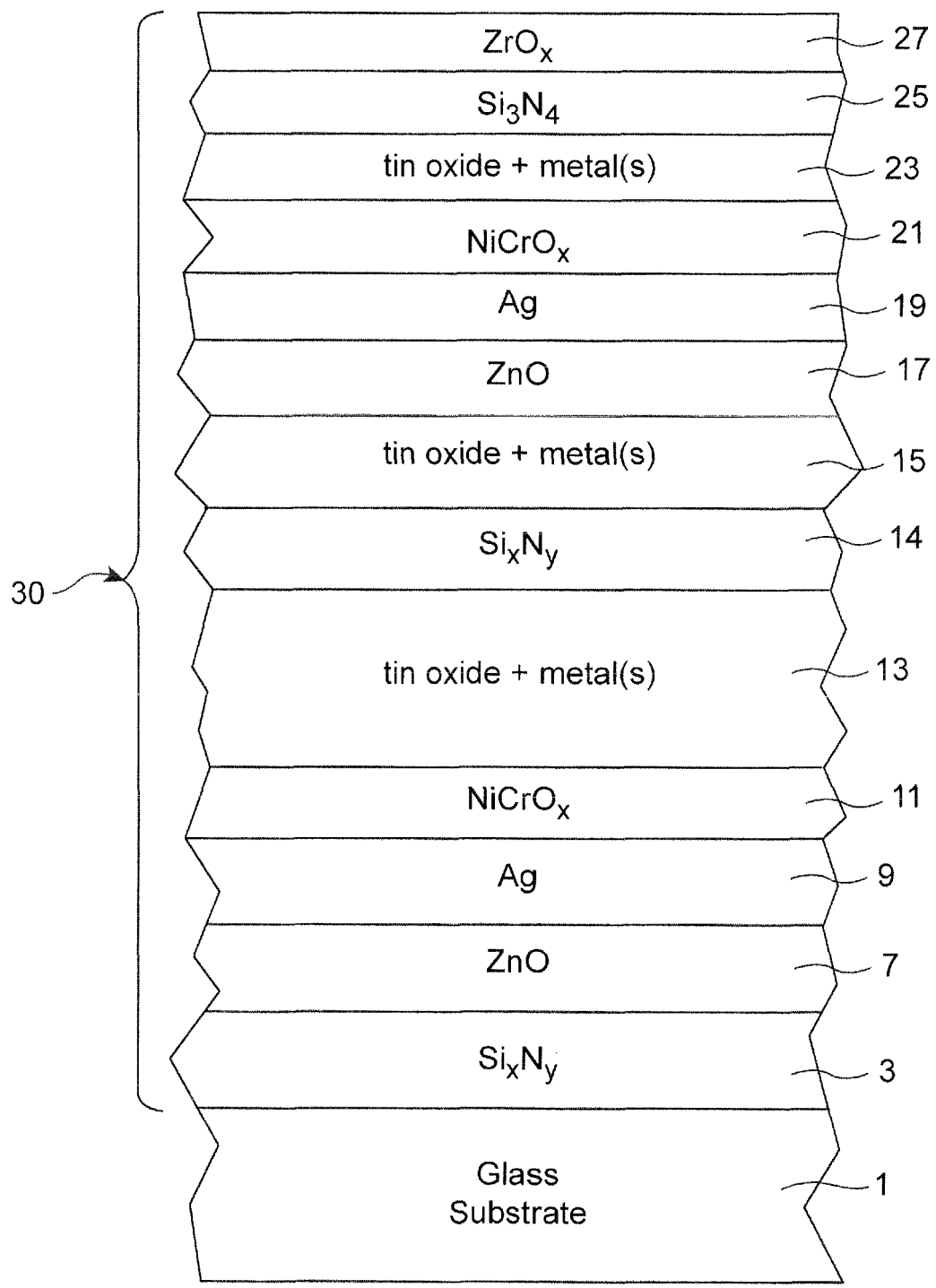
FIG. 1 is a cross sectional view of a coated article according to an example embodiment of this invention.

Like reference numerals refer to like parts throughout the drawings herein. The layers in the embodiments of FIGS. 1-4 are preferably formed by sputter-deposition, via ceramic or metal target(s), in example embodiments of this invention.

Coated articles according to certain example embodiments of this invention may be used in the context of windows, including monolithic windows for buildings, IG windows for buildings, vehicle windows, and/or in any other suitable application.

In certain example embodiments, it has been found that including certain additional metal(s) in a tin oxide (e.g., $SnO_2$) inclusive dielectric layer (see one or more of layers 13, 15, 23, and 40 in the figures) can overcome one or more of the above-identified problems. For example, one or more of the following metal(s) can be added to tin oxide in sputter-depositing one or more of dielectric layers 13, 15, 23, and 40 in such a coating: Pd, Ag, Bi, In, Sb, Al, Mg, and/or Cu. Ternary and/or binary alloys can be used to replace some of the tin in the oxide based dielectric layer(s) (e.g., one or more of 13, 15, 23, 40) in order to make the dielectric layer and overall coating 30, 60, 70 more thermally stable before and/or after optional heat treatment (HT), and reduce and/or slow stress change during the optional heat treatment process. For example, a binary alloy of SnPd can be used to replace some of the tin in the oxide based dielectric layer(s) (e.g., one or more of layer(s) 13, 15, 23, 40) in order to make the dielectric layer and overall coating 30, 60, 70 more thermally stable. As other examples, a binary alloy of SnAg, SnSb, SnBi, SnW, or SnMg can be used to replace some of the tin in the oxide based dielectric layer(s) (e.g., one or more of layer(s) 13, 15, 23, 40) in order to make the dielectric layer and overall coating 30, 60, 70 more thermally stable. As other examples, a ternary alloy of SnZnBi, SnInZn, SnZnSb, SnZnAl, SnZnMg, SnZnCu, SnInGa, SnSbBi, SnCuBi, or SnCuSb can be used to replace some of the tin in the oxide based dielectric layer(s) (e.g., one or more of layer(s) 13, 15, 23, 40) in order to make the dielectric layer and overall coating 30, 60, 70 more thermally stable. Of course, an oxide of one of these ternary or binary alloys may be used for one or two of layers 13, 15, 23, and/or 40, while an oxide of another of these ternary or binary allows may be used for other(s) of layers 13, 15, 23, 40. Such tin oxide inclusive dielectric layers, with additional metal(s) included therein, are preferably fully or substantially fully oxidized, and may be amorphous following optional HT.

The structure of the tin oxide inclusive dielectric layer, having the additional metal(s), is more chaotic and causes the layer and coating to be more stable. It has been found that the more chaotic the structure of the material is, the more stable it can be (e.g., upon HT). Such a tin oxide inclusive dielectric layer, with other metal(s) added thereto, may be used as a dielectric layer in any suitable low-E coating in certain example embodiments of this invention, such as between at least first and second IR reflecting layers 9, 19, under IR reflecting layers 9, 19, and/or over IR reflecting layers 9, 19. Such layers may be used in single silver, double silver, or triple silver low-E coatings in various embodiments of this invention. However, not all dielectric layers in the coating need to be of such a material. In certain example embodiments, a tin oxide inclusive dielectric layer, with other metal(s) added thereto, may be used in a coating that also includes other dielectric layers of materials such as silicon nitride (e.g., $Si_3N_4$), $SnO_2$, ZnO, and/or the like as shown in FIGS. 1-4. The use of one or more such tin oxide inclusive dielectric layers, with additional metal(s) therein, allows improved thermal stability such as lower glass side reflective $\Delta E^*$ values to be achieved. In certain example embodiments of this invention, the coated article including the glass substrate 1 and low-E coating thereon has a glass side reflective $\Delta E^*$ value due to HT which is at least 1.0 lower (more preferably at least 1.5 or 2.0 lower) compared to if only $SnO_2$ was used for the layer(s). In certain example embodiments of this invention, the coated article including the glass substrate 1 and low-E coating thereon has a glass side reflective $\Delta E^*$ value of no greater than 5.0, more preferably no greater than 4.5 or 4.0.

Figure 2:
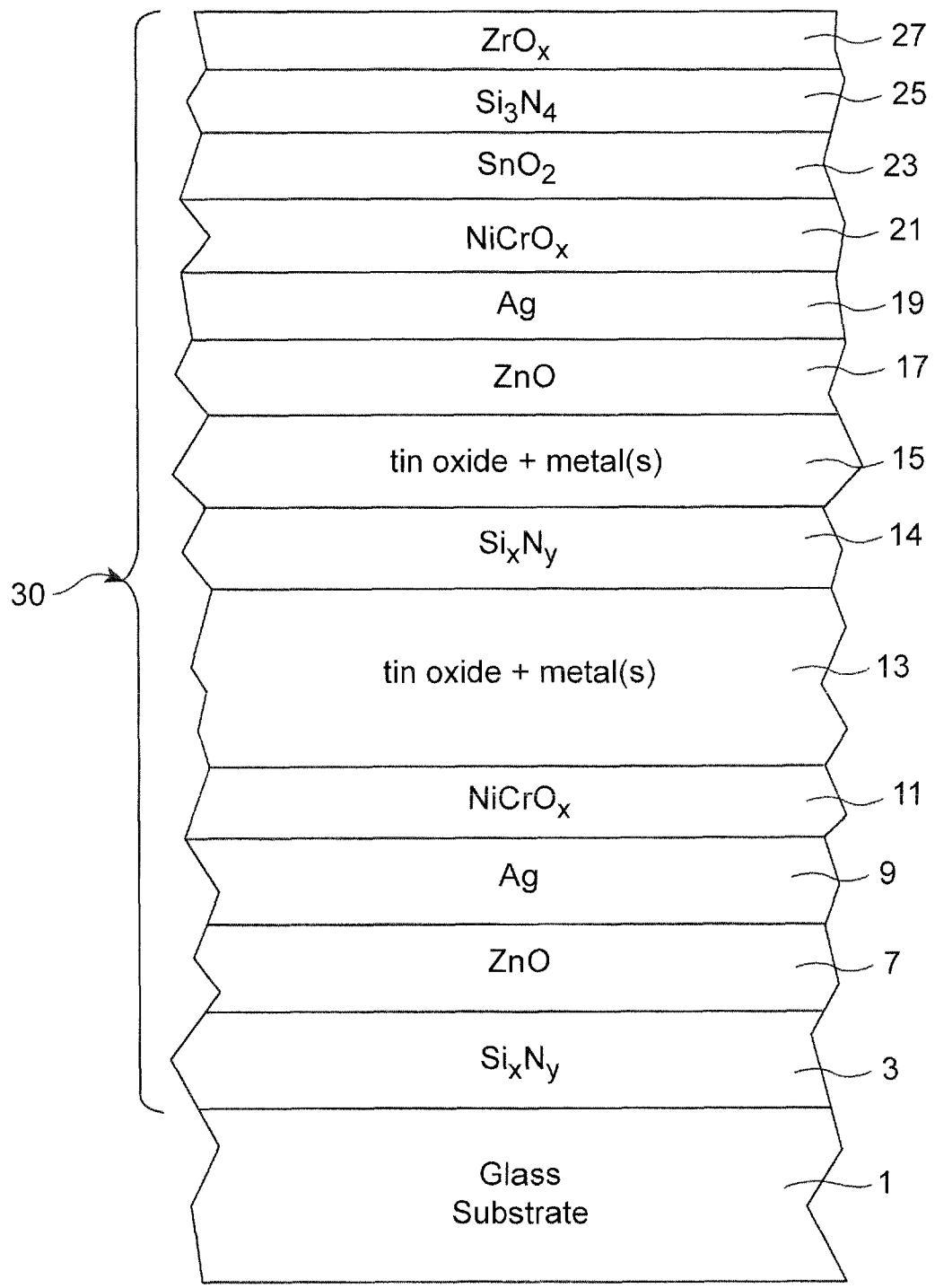
FIG. 2 is a cross sectional view of a coated article according to another example embodiment of this invention.
Figure 3:
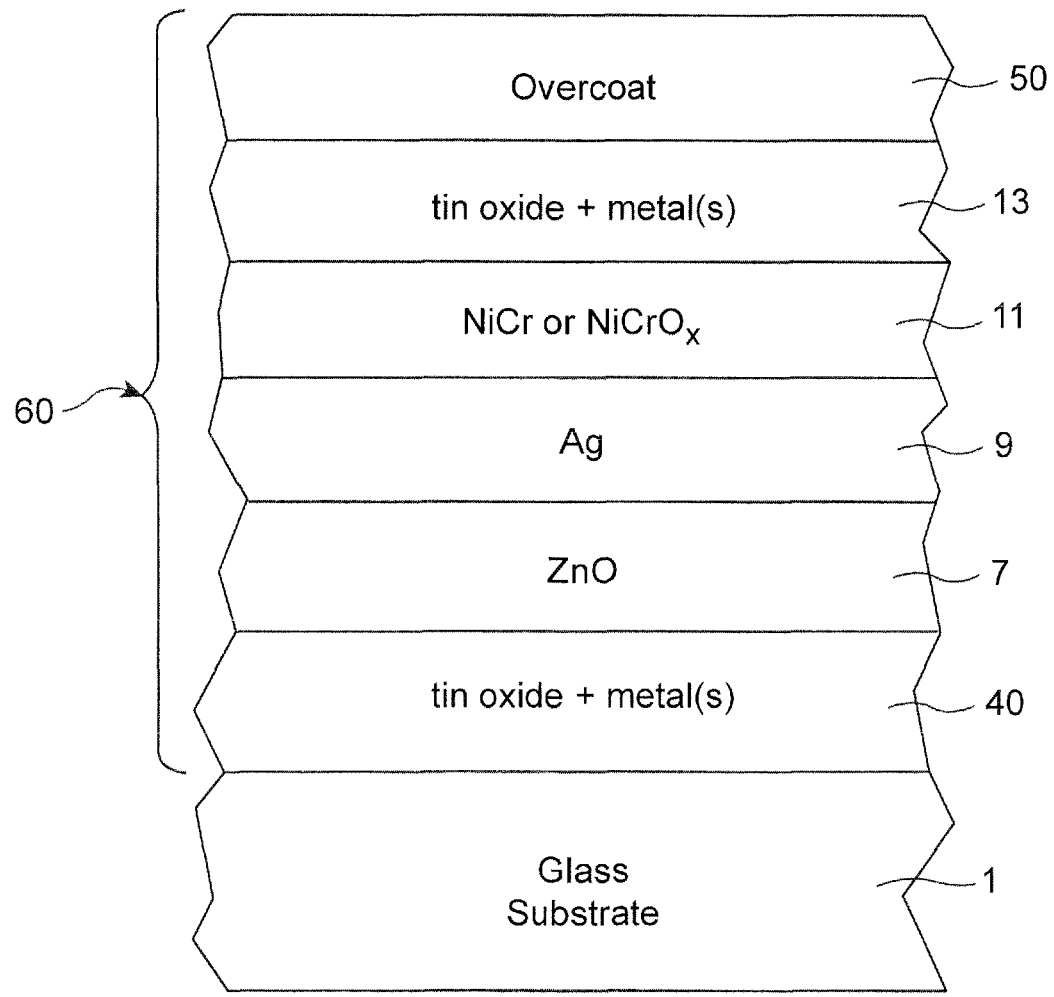
FIG. 3 is a cross sectional view of a coated article according to another example embodiment of this invention.
Figure 4:
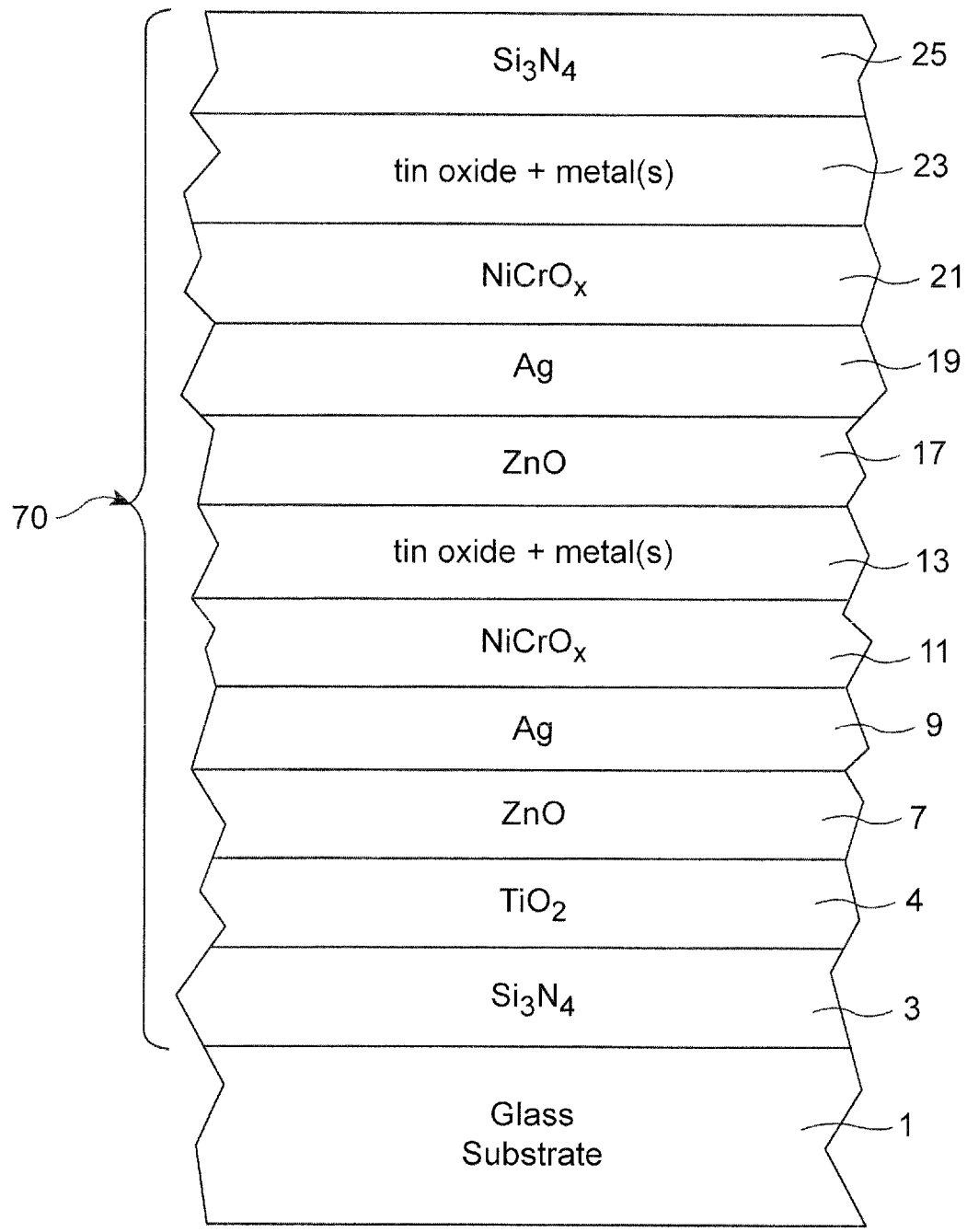
FIG. 4 is a cross sectional view of a coated article according to another example embodiment of this invention.

In certain example embodiments, the tin oxide inclusive dielectric layer (13, 15 and/or 40), with additional metal(s) included therein, is located under and directly contacting a zinc oxide inclusive seed layer (7 and/or 17) that supports an IR reflecting layer (9 and/or 19) in order to improve the quality of the IR reflecting layer—e.g., see layer 15 in FIGS. 1-2, layer 40 in FIG. 3, and layer 13 in FIG. 4. The structure and thermal stability of the layer under the ZnO based contact layer (7 or 17) is relevant for the textured growth of ZnO (002) and the Ag growth thereover (111). Pure $SnO_2$ layers are subject to structural change including high stress which tends to degrade optical and thermal stability of the coating, e.g., upon HT. Pure $SnO_2$ layers are typically amorphous as sputter deposited, but upon HT become crystalline. The additional metal(s) provided in the tin oxide inclusive dielectric layer discussed herein reduce such structural changes and improve stress control of the layer before and after HT, and in certain example embodiments allow the layer to remain amorphous or substantially amorphous even after HT. This will improve the overall performance of the low-E coating.

In certain example embodiments of this invention (e.g., FIGS. 1-2 and 4), the coating includes a double-silver stack, although this invention is not so limited in all instances. Coated articles having low-E coatings according to example embodiments of this invention have a sheet resistance ($R_S$) of less than or equal to 7.0 (more preferably less than or equal to 5.0, even more preferably less than or equal to 4.0 or 3.0) (measured before and/or after optional HT). Coated articles having low-E coatings according to example embodiments of this invention have a normal emissivity ($E_n$) of no greater than about 0.09, more preferably no greater than about 0.07, and most preferably no greater than about 0.05 or 0.04 (measured before and/or after optional HT). In certain example embodiments, before and/or after optional heat treatment (HT) and as measured in monolithic form, coated articles according to example embodiments of this invention have a visible transmission (Ill. C, 2 degree) of at least about 30%, more preferably of at least about 40%, even more preferably of at least about 50%, and possibly of at least about 60%.

The terms "heat treatment" and "heat treating" as used herein mean heating the article to a temperature sufficient to achieve thermal tempering, heat bending, and/or heat strengthening of the glass inclusive coated article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes or more. Coated articles may or may not be heat treated in different example embodiments of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and low-E coating (or layer system) 30 provided on the substrate 1 either directly or indirectly. The coating (or layer system) 30 includes: bottom silicon nitride inclusive dielectric layer 3 which may be $Si_3N_4$, of the Si-rich type for haze reduction, or of any other suitable stoichiometry in different embodiments of this invention, first lower contact layer 7 (which contacts IR reflecting layer 9), first conductive and preferably metallic or substantially metallic infrared (IR) reflecting layer 9, first upper contact layer 11 (which contacts layer 9), tin oxide inclusive dielectric layer 13, another silicon nitride inclusive layer 14, tin oxide inclusive dielectric layer 15, second lower contact layer 17 (which contacts IR reflecting layer 19), second conductive and preferably metallic or substantially metallic IR reflecting layer 19, second upper contact layer 21 (which contacts layer 19), dielectric layer 23 which may include tin oxide in certain example instances, silicon nitride inclusive dielectric layer 25, and optional protective dielectric layer 27 of or including zirconium oxide. The "contact" layers 7, 11, 17 and 21 each contact at least one IR reflecting layer (e.g., layer based on Ag). The aforesaid sputter-deposited layers 3-27 make up low-E (i.e., low emissivity) coating 30 which is provided on glass or plastic substrate 1.

In monolithic instances, the coated article includes only one glass substrate 1 as illustrated in FIG. 1 (and also in FIGS. 2-4). However, monolithic coated articles herein (e.g., see FIGS. 1-4) may be used in devices such as laminated vehicle windshields, IG window units, and the like. As for IG window units, an IG window unit may include two spaced apart substrates. An example IG window unit is illustrated and described, for example, in U.S. Pat. No. 6,632,491, the disclosure of which is hereby incorporated herein by reference. An example IG window unit may include, for example, the coated glass substrate 1 shown in any of FIGS. 1-4 (or elsewhere described herein) coupled to another glass substrate (not shown) via spacer(s), sealant(s) or the like with a gap being defined therebetween. This gap between the substrates in IG unit embodiments may in certain instances be filled with a gas such as argon (Ar).

The FIG. 2 embodiment is the same as the FIG. 1 embodiment except that dielectric layer 23 in the FIG. 2 embodiment is of $SnO_2$ in order to emphasize that the coating may include one or more dielectric layers of $SnO_2$ where the additional metal(s) is not added thereto. FIG. 2 emphasizes that $SnO_2$ may be used to replace the tin oxide with additional metal(s) material in one or two of layers 13, 15, 23.

The FIG. 3 embodiment illustrates a coated article where the low-F coating 60 is a single-silver coating, as opposed to a double silver coating. Layers in the FIG. 3 embodiment identified with reference numerals identified in FIG. 1 may be considered like layers.

The FIG. 4 embodiment illustrates a coated article including a low-E coating 70 according to another example embodiment of this invention. The FIG. 4 embodiment differs from the FIG. 1 embodiment in numerous respects. For example, the layers 14, 15, and 27 from the FIG. 1 embodiment need not be present in the FIG. 4 embodiment. Additionally, the FIG. 4 embodiment includes a dielectric layer 4 of or including titanium oxide (e.g., $TiO_2$) between the bottom silicon nitride inclusive layer 3 and the bottom zinc oxide inclusive layer 7. As mentioned above, like reference numerals refer to like parts/layers throughout the figures.

Dielectric layers 3, 14, and 25 may be of or include silicon nitride in certain embodiments of this invention. Silicon nitride layers 3 and 14 may, among other things, improve heat-treatability of the coated articles, e.g., such as thermal tempering or the like. The silicon nitride of layers 3 and/or 14 may be of the stoichiometric type (i.e., $Si_3N_4$), or alternatively of the Si-rich type in different embodiments of this invention. For example, Si-rich silicon nitride 3 (and/or 14) combined with zinc oxide and/or tin oxide under a silver based IR reflecting layer may permit the silver to be deposited (e.g., via sputtering or the like) in a manner which causes its sheet resistance to be lessened compared to if certain other material(s) were under the silver. Moreover, the presence of free Si in a Si-rich silicon nitride inclusive layer 3 may allow certain atoms such as sodium (Na) which migrate outwardly from the glass 1 during heat treatment (HT) to be more efficiently stopped by the Si-rich silicon nitride inclusive layer before they can reach the silver and damage the same. Thus, it is believed that the oxidation caused by heat treatment allows visible transmission to increase, and that the Si-rich $Si_xN_y$ in layer 3 for example can reduce the amount of damage done to the silver layer(s) during HT in certain example embodiments of this invention thereby allowing sheet resistance ($R_S$) to decrease or remain about the same in a satisfactory manner.

In certain example embodiments, when Si-rich silicon nitride is used in layer 3 and/or 14, the Si-rich silicon nitride layer as deposited may be characterized by $Si_xN_y$ layer(s), where x/y may be from 0.76 to 1.5, more preferably from 0.8 to 1:4, still more preferably from 0.85 to 1.2. Moreover, in certain example embodiments, before and/or after HT the Si-rich $Si_xN_y$ layer(s) may have an index of refraction "n" of at least 2.05, more preferably of at least 2.07, and sometimes at least 2.10 (e.g., 632 nm) (note: stoichiometric $Si_3N_4$ which may also be used has an index "n" of 2.02-2.04). In certain example embodiments, it has surprisingly been found that improved thermal stability is especially realizable when the Si-rich $Si_xN_y$ layer(s) as deposited has an index of refraction "n" of at least 2.10, more preferably of at least 2.20, and most preferably from 2.2 to 2.4. Also, the Si-rich $Si_xN_y$ layer in certain example embodiments may have an extinction coefficient "k" of at least 0.001, more preferably of at least 0.003 (note: stoichiometric $Si_3N_4$ has an extinction coefficient "k" of effectively 0). Again, in certain example embodiments, it has surprisingly been found that improved thermal stability can be realized when "k" for the Si-rich $Si_xN_y$ layer(s) is from 0.001 to 0.05 as deposited (550 nm). It is noted that n and k tend to drop due to heat treatment.

Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in an atmosphere including at least nitrogen gas in certain embodiments of this invention.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention.

The upper contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, NiCrO$_x$ or NiCr in these layers (11 and/or 21) allows durability to be improved. The NiCrO$_x$ of layers 11 and/or 21 may be fully oxidized in certain embodiments of this invention (i.e., fully stoichiometric), or alternatively may only be partially oxidized (i.e., sub-oxide), or alternatively may be metallic in NiCr embodiments. In certain instances, NiCrO$_x$ layers 11 and/or 21 may be at least about 50% oxidized. Contact layers 11 and/or 21 (e.g., of or including an oxide of Ni and/or Cr) may or may not be oxidation graded in different embodiments of this invention. Oxidation grading means that the degree of oxidation in the layer changes throughout the thickness of the layer. For example, a contact layer 11 and/or 21 may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layers 11 and/or 21 (e.g., of or including Ni and/or Cr) may or may not be continuous in different embodiments of this invention across the entire underlying IR reflecting layer.

Dielectric seed layers 7 and 17 may be of or include zinc oxide in certain example embodiments of this invention. However, as with other layers herein, other materials may be used in different instances. In certain preferred embodiments, lower contact layers 7 and/or 17 are of or include ZnO. The zinc oxide of layers 7 and 17 may contain other materials as well such as Al (e.g., to form ZnAlO$_x$). For example, in certain example embodiments of this invention, one or more of zinc oxide layers 7, 17 may be doped with from about 1 to 10% Al, more preferably from about 1 to 5% Al, and most preferably about 1 to 4% Al.

Overcoat dielectric layer 27 may be of or include zirconium oxide (e.g., ZrO$_2$) in certain example embodiments of this invention. This layer, like other layers discussed herein, is optional and need not be provided in certain example embodiments of this invention.

Referring to FIGS. 1-4, one or more of dielectric layers 13, 15, 23, 40 may be of or include an oxide of SnPd in certain example embodiments of this invention, where the layer(s) is substantially transparent and fully or substantially fully oxidized. For example, the SnPd oxide material may be used for only layer 15 in the FIG. 1-2 embodiments, with essentially SnO$_2$ or other suitable dielectric material being used for layers 13 and 23. Alternatively, for example, the SnPd oxide material may be used for two or all three of layers 13, 15, and 23 in the FIG. 1 embodiment. As another example, the SnPd oxide material may be used for one or both of layers 40 and/or 13 in the FIG. 3 embodiment, and may be used for one or both of layers 13 and/or 23 in the FIG. 4 embodiment. For example, if the SnPd oxide is used for layer 13 in the FIG. 4 embodiment, SnO$_2$, SnZnO, or other suitable dielectric material may be used for layer 23. In certain example embodiments, when SnPd oxide is used in or for one or more of layers 13, 15, 23, 40, the layer preferably contains more substantially more Sn than Pd; with an example being that the metal content of the layer is from about 50-99.5% Sn (more preferably from about 60-99.5%, even more preferably from about 70-99%, even more preferably from about 80-98% Sn) and from about 0.5-50% Pd (more preferably from about 0.5-30%, more preferably from about 1-20%, and most preferably from about 3-15% Pd). An example is SnPd oxide, where the metal content is about 90% Sn and about 10% Pd. Material percentages (%) herein are atomic %. Of course, small amounts of other materials may also be included in the layer(s). In other embodiments of this invention, this tin oxide inclusive material with additional metal Pd may be used for any of the tin oxide based dielectric layers in any coating in any of U.S. Pat. Nos. 7,521,096, 7,879,448, 8,142,622, 7,648, 769, 8,017,243, 7,597,965, or 7,858,191, the disclosures of which are hereby incorporated herein by reference.

Referring to FIGS. 1-4, one or more of dielectric layers 13, 15, 23, 40 may be of or include an oxide of SnAg in certain example embodiments of this invention, where the layer(s) is substantially transparent and fully or substantially fully oxidized. For example, the SnAg oxide material may be used for only layer 15 in the FIG. 1-2 embodiments, with essentially SnO$_2$ or other suitable dielectric material being used for layers 13 and 23. Alternatively, for example, the SnAg oxide material may be used for two or all three of layers 13, 15, and 23 in the FIG. 1 embodiment. As another example, the SnAg oxide material may be used for one or both of layers 40 and/or 13 in the FIG. 3 embodiment, and may be used for one or both of layers 13 and/or 23 in the FIG. 4 embodiment. For example, if the SnAg oxide is used for layer 13 in the FIG. 4 embodiment, SnO$_2$, SnZnO, or other suitable dielectric material may be used for layer 23. In certain example embodiments, when SnAg oxide is used in or for one or more of layers 13, 15, 23, 40, the layer preferably contains more substantially more Sn than Ag; with an example being that the metal content of the layer is from about 60-99.5% Sn (more preferably from about 70-99.5%, even more preferably from about 75-99%, even more preferably from about 85-99% or 90-98% Sn) and from about 0.5-40% Ag (more preferably from about 0.5-30%, more preferably from about 1-20%, and most preferably from about 1-10% Ag). An example is SnAg oxide, where the metal content is about 95% Sn and about 5% Ag. Of course, small amounts of other materials may also be included in the layer(s). In other embodiments of this invention, this tin oxide inclusive material with additional metal Ag may be used for any of the tin oxide based dielectric layers in any coating in any of U.S. Pat. Nos. 7,521,096, 7,879,448, 8,142,622, 7,648,769, 8,017,243, 7,597,965, or 7,858,191.

Referring to FIGS. 1-4, one or more of dielectric layers 13, 15, 23, 40 may be of or include an oxide of SnMg in certain example embodiments of this invention, where the layer(s) is substantially transparent and fully or substantially fully oxidized. For example, the SnMg oxide material may be used for only layer 15 in the FIG. 1-2 embodiments, with essentially SnO$_2$ or other suitable dielectric material being used for layers 13 and 23. Alternatively, for example, the SnMg oxide material may be used for two or all three of layers 13, 15, and 23 in the FIG. 1 embodiment. As another example, the SnMg oxide material may be used for one or both of layers 40 and/or 13 in the FIG. 3 embodiment, and may be used for one or both of layers 13 and/or 23 in the FIG. 4 embodiment. For example, if the SnMg oxide is used for layer 13 in the FIG. 4 embodiment, SnO$_2$, SnZnO, or other suitable dielectric material may be used for layer 23. In certain example embodiments, when SnMg oxide is used in or for one or more of layers 13, 15, 23, 40, the layer preferably contains more substantially more Sn than Mg; with an example being that the metal content of the layer is from about 50-99.5% Sn (more preferably from about 60-99.5%, even more preferably from about 70-99%, even more preferably from about 80-98% Sn) and from about 0.5-50% Mg (more preferably from about 0.5-30%, more preferably from about 1-20%, and most preferably from about 3-15% Mg). An example is SnMg oxide, where the metal content is about 90% Sn and about 10% Mg. Of course, small amounts of other materials may also be included in the layer(s). In other embodiments of this invention, this tin oxide inclusive material with additional metal Mg may be used for any of the tin oxide based dielectric layers in any coating in any of U.S. Pat. Nos. 7,521,096, 7,879,448, 8,142,622, 7,648,769, 8,017,243, 7,597,965, or 7,858,191.

Referring to FIGS. 1-4, one or more of dielectric layers 13, 15, 23, 40 may be of or include an oxide of SnSb in certain example embodiments of this invention, where the layer(s) is substantially transparent and fully or substantially fully oxidized. For example, the SnSb oxide material may be used for only layer 15 in the FIG. 1-2 embodiments, with essentially $SnO_2$ or other suitable dielectric material being used for layers 13 and 23. Alternatively, for example, the SnSb oxide material may be used for two or all three of layers 13, 15, and 23 in the FIG. 1 embodiment. As another example, the SnSb oxide material may be used for one or both of layers 40 and/or 13 in the FIG. 3 embodiment, and may be used for one or both of layers 13 and/or 23 in the FIG. 4 embodiment. For example, if the SnSb oxide is used for layer 13 in the FIG. 4 embodiment, $SnO_2$, SnZnO, or other suitable dielectric material may be used for layer 23. In certain example embodiments, when SnSb oxide is used in or for one or more of layers 13, 15, 23, 40, the layer preferably contains more substantially more Sn than Sb; with an example being that the metal content of the layer is from about 60-99.5% Sn (more preferably from about 70-99.5%, even more preferably from about 75-99%, even more preferably from about 85-99% or 90-98% Sn) and from about 0.5-40% Sb (more preferably from about 0.5-30%, more preferably from about 1-20%, and most preferably from about 1-10% Sb). An example is SnSb oxide, where the metal content is about 95% Sn and about 5% Sb. Of course, small amounts of other materials may also be included in the layer(s). In other embodiments of this invention, this tin oxide inclusive material with additional metal Sb may be used for any of the tin oxide based dielectric layers in any coating in any of U.S. Pat. Nos. 7,521,096, 7,879,448, 8,142,622, 7,648,769, 8,017,243, 7,597,965, or 7,858,191.

Referring to FIGS. 1-4, one or more of dielectric layers 13, 15, 23, 40 may be of or include an oxide of SnZnBi in certain example embodiments of this invention, where the layer(s) is substantially transparent and fully or substantially fully oxidized. For example, the SnZnBi oxide material may be used for only layer 15 in the FIG. 1-2 embodiments, with essentially $SnO_2$ or other suitable dielectric material being used for layers 13 and 23. Alternatively, for example, the SnZnBi oxide material may be used for two or all three of layers 13, 15, and 23 in the FIG. 1 embodiment. As another example, the SnZnBi oxide material may be used for one or both of layers 40 and/or 13 in the FIG. 3 embodiment, and may be used for one or both of layers 13 and/or 23 in the FIG. 4 embodiment. For example, if the SnZnBi oxide is used for layer 13 in the FIG. 4 embodiment, $SnO_2$, SnZnO, or other suitable dielectric material may be used for layer 23. In certain example embodiments, when SnZnBi oxide is used in or for one or more of layers 13, 15, 23, 40, the layer preferably contains more substantially more Sn and Zn than Bi; with an example being that the metal content of the layer is from about 10-70% Sn (more preferably from about 20-60%, even more preferably from about 30-50%, even more preferably from about 35-45% Sn), from about 20-80% Zn (more preferably from about 30-70%, even more preferably from about 40-60%, even more preferably from about 45-55% Zn), and from about 1-60% Bi (more preferably from about 1-30%, more preferably from about 2-20%, and most preferably from about 3-15% Bi). An example is SnZnBi oxide, where the metal content is about 40% Sn, about 50% Zn, and about 10% Bi. Of course, small amounts of other materials may also be included in the layer(s). In other embodiments of this invention, this tin oxide inclusive material with additional metals Zn and Bi may be used for any of the tin oxide based dielectric layers in any coating in any of U.S. Pat. Nos. 7,521,096, 7,879,448, 8,142,622, 7,648,769, 8,017,243, 7,597,965, or 7,858,191.

Referring to FIGS. 1-4, one or more of dielectric layers 13, 15, 23, 40 may be of or include an oxide of SnInZn in certain example embodiments of this invention, where the layer(s) is substantially transparent and fully or substantially fully oxidized. For example, the SnInZn oxide material may be used for only layer 15 in the FIG. 1-2 embodiments, with essentially $SnO_2$ or other suitable dielectric material being used for layers 13 and 23. Alternatively, for example, the SnInZn oxide material may be used for two or all three of layers 13, 15, and 23 in the FIG. 1 embodiment. As another example, the SnInZn oxide material may be used for one or both of layers 40 and/or 13 in the FIG. 3 embodiment, and may be used for one or both of layers 13 and/or 23 in the FIG. 4 embodiment. For example, if the SnInZn oxide is used for layer 13 in the FIG. 4 embodiment, $SnO_2$, SnZnO, or other suitable dielectric material may be used for layer 23. In certain example embodiments, when SnInZn oxide is used in or for one or more of layers 13, 15, 23, 40, the layer preferably contains more substantially more Sn and In than Zn; with an example being that the metal content of the layer is from about 10-70% Sn (more preferably from about 20-60%, even more preferably from about 30-55%, even more preferably from about 40-50% Sn), from about 20-80% In (more preferably from about 30-70%, even more preferably from about 40-60%, even more preferably from about 45-55% In), and from about 0.5-50% Zn (more preferably from about 0.5-30%, more preferably from about 1-20%, and most preferably from about 1-10% Zn). An example is SnInZn oxide, where the metal content is about 46% Sn, about 52% In, and about 2% Zn. Of course, small amounts of other materials may also be included in the layer(s). In other embodiments of this invention, this tin oxide inclusive material with additional metals Zn and In may be used for any of the tin oxide based dielectric layers in any coating in any of U.S. Pat. Nos. 7,521,096, 7,879,448, 8,142,622, 7,648,769, 8,017,243, 7,597,965, or 7,858,191.

Referring to FIGS. 1-4, one or more of dielectric layers 13, 15, 23, 40 may be of or include an oxide of SnZnSb in certain example embodiments of this invention, where the layer(s) is substantially transparent and fully or substantially fully oxidized. For example, the SnZnSb oxide material may be used for only layer 15 in the FIG. 1-2 embodiments, with essentially $SnO_2$ or other suitable dielectric material being used for layers 13 and 23. Alternatively, for example, the SnZnSb oxide material may be used for two or all three of layers 13, 15, and 23 in the FIG. 1 embodiment. As another example, the SnZnSb oxide material may be used for one or both of layers 40 and/or 13 in the FIG. 3 embodiment, and may be used for one or both of layers 13 and/or 23 in the FIG. 4 embodiment. For example, if the SnZnSb oxide is used for layer 13 in the FIG. 4 embodiment, $SnO_2$, SnZnO, or other suitable dielectric material may be used for layer 23. In certain example embodiments, when SnZnSb oxide is used in or for one or more of layers 13, 15, 23, 40, the layer preferably contains more substantially more Sn and Zn than Sb; with an example being that the metal content of the layer is from about 10-70% Sn (more preferably from about 10-55%, even more preferably from about 20-40%, even more preferably from about 25-35% Sn), from about 20-80% Zn (more preferably from about 30-70%, even more preferably from about 40-60%, even more preferably from about 45-55% Zn), and from about 1-60% Sb (more preferably from about 5-40%, more preferably from about 10-30%, and most preferably from about 15-25% Sb). An example is SnZnSb oxide, where the metal content is about 30% Sn, about 50% Zn, and about 20% Sb. Of course, small amounts of other materials may also be included in the layer(s). In other embodiments of this invention, this tin oxide inclusive material with additional metals Zn and Sb may be used for any of the tin oxide based dielectric layers in any coating in any of U.S. Pat. Nos. 7,521,096, 7,879,448, 8,142,622, 7,648,769, 8,017,243, 7,597,965, or 7,858,191.

Referring to FIGS. 1-4, one or more of dielectric layers 13, 15, 23, 40 may be of or include an oxide of SnZnAl in certain example embodiments of this invention, where the layer(s) is substantially transparent and fully or substantially fully oxided. For example, the SnZnAl oxide material may be used for only layer 15 in the FIG. 1-2 embodiments, with essentially $SnO_2$ or other suitable dielectric material being used for layers 13 and 23. Alternatively, for example, the SnZnAl oxide material may be used for two or all three of layers 13, 15, and 23 in the FIG. 1 embodiment. As another example, the SnZnAl oxide material may be used for one or both of layers 40 and/or 13 in the FIG. 3 embodiment, and may be used for one or both of layers 13 and/or 23 in the FIG. 4 embodiment. For example, if the SnZnAl oxide is used for layer 13 in the FIG. 4 embodiment, $SnO_2$, SnZnO, or other suitable dielectric material may be used for layer 23. In certain example embodiments, when SnZnAl oxide is used in or for one or more of layers 13, 15, 23, 40, the layer preferably contains more substantially more Sn and Zn than Al; with an example being that the metal content of the layer is from about 30-95% Sn (more preferably from about 40-93%, even more preferably from about 60-90%, even more preferably from about 75-86% Sn), from about 0.5-60% Zn (more preferably from about 2-35%, even more preferably from about 4-20%, even more preferably from about 5-15% Zn), and from about 0.5-20% Al (more preferably from about 0.5-15%, more preferably from about 1-15%, and most preferably from about 3-10% Al). An example is SnZnAl oxide, where the metal content is about 83% Sn, about 10% Zn, and about 7% Al. Of course, small amounts of other materials may also be included in the layer(s). In other embodiments of this invention, this tin oxide inclusive material with additional metals Zn and Al may be used for any of the tin oxide based dielectric layers in any coating in any of U.S. Pat. Nos. 7,521,096, 7,879,448, 8,142,622, 7,648,769, 8,017,243, 7,597,965, or 7,858,191.

Referring to FIGS. 1-4, one or more of dielectric layers 13, 15, 23, 40 may be of or include an oxide of SnZnMg in certain example embodiments of this invention, where the layer(s) is substantially transparent and fully or substantially fully oxided. For example, the SnZnMg oxide material may be used for only layer 15 in the FIG. 1-2 embodiments, with essentially $SnO_2$ or other suitable dielectric material being used for layers 13 and 23. Alternatively, for example, the SnZnMg oxide material may be used for two or all three of layers 13, 15, and 23 in the FIG. 1 embodiment. As another example, the SnZnMg oxide material may be used for one or both of layers 40 and/or 13 in the FIG. 3 embodiment, and may be used for one or both of layers 13 and/or 23 in the FIG. 4 embodiment. For example, if the SnZnMg oxide is used for layer 13 in the FIG. 4 embodiment, $SnO_2$, SnZnO, or other suitable dielectric material may be used for layer 23. In certain example embodiments, when SnZnMg oxide is used in or for one or more of layers 13, 15, 23, 40, the layer preferably contains more substantially more Sn and Zn than Mg; with an example being that the metal content of the layer is from about 30-95% Sn (more preferably from about 40-93%, even more preferably from about 60-90%, even more preferably from about 75-87% Sn), from about 0.5-60% Zn (more preferably from about 2-35%, even more preferably from about 4-20%, even more preferably from about 5-15% Zn), and from about 0.5-20% Mg (more preferably from about 0.5-12%, more preferably from about 1-15%, and most preferably from about 3-10% Mg). An example is SnZnMg oxide, where the metal content is about 85% Sn, about 10% Zn, and about 5% Mg. Of course, small amounts of other materials may also be included in the layer(s). In other embodiments of this invention, this tin oxide inclusive material with additional metals Zn and Mg may be used for any of the tin oxide based dielectric layers in any coating in any of U.S. Pat. Nos. 7,521,096, 7,879,448, 8,142,622, 7,648,769, 8,017,243, 7,597,965, or 7,858,191.

Referring to FIGS. 1-4, one or more of dielectric layers 13, 15, 23, 40 may be of or include an oxide of SnCuSb in certain example embodiments of this invention, where the layer(s) is substantially transparent and fully or substantially fully oxided (note that "substantially fully oxided" as used herein means oxided to at least about 80% of being fully oxided). For example, the SnCuSb oxide material may be used for only layer 15 in the FIG. 1-2 embodiments, with essentially $SnO_2$ or other suitable dielectric material being used for layers 13 and 23. Alternatively, for example, the SnCuSb oxide material may be used for two or all three of layers 13, 15, and 23 in the FIG. 1 embodiment. As another example, the SnCuSb oxide material may be used for one or both of layers 40 and/or 13 in the FIG. 3 embodiment, and may be used for one or both of layers 13 and/or 23 in the FIG. 4 embodiment. For example, if the SnCuSb oxide is used for layer 13 in the FIG. 4 embodiment, $SnO_2$, SnZnO, or other suitable dielectric material may be used for layer 23. In certain example embodiments, when SnCuSb oxide is used in or for one or more of layers 13, 15, 23, 40, the layer preferably contains more substantially more Sn than Cu and Sb; with an example being that the metal content of the layer is from about 30-97% Sn (more preferably from about 45-95%, even more preferably from about 60-95%, even more preferably from about 80-95% Sn), from about 0.1-20% Cu (more preferably from about 0.1-10%, even more preferably from about 1-8%, even more preferably from about 2-7% Cu), and from about 0.1-20% Sb (more preferably from about 0.5-15%, more preferably from about 1-10%, and most preferably from about 2-8% Sb). An example is SnCuSb oxide, where the metal content is about 91% Sn, about 4.5% Cu, and about 4.5% Sb. Of course, small amounts of other materials may also be included in the layer(s). In other embodiments of this invention, this tin oxide inclusive material with additional metals Cu and Sb may be used for any of the tin oxide based dielectric layers in any coating in any of U.S. Pat. Nos. 7,521,096, 7,879,448, 8,142, 622, 7,648,769, 8,017,243, 7,597,965, or 7,858,191.

Referring to FIGS. 1-4, one or more of dielectric layers 13, 15, 23, 40 may be of or include an oxide of SnCuBi in certain example embodiments of this invention, where the layer(s) is substantially transparent and fully or substantially fully oxided. For example, the SnCuBi oxide material may be used for only layer 15 in the FIG. 1-2 embodiments, with essentially $SnO_2$ or other suitable dielectric material being used for layers 13 and 23. Alternatively, for example, the SnCuBi oxide material may be used for two or all three of layers 13, 15, and 23 in the FIG. 1 embodiment. As another example, the SnCuBi oxide material may be used for one or both of layers 40 and/or 13 in the FIG. 3 embodiment, and may be used for one or both of layers 13 and/or 23 in the FIG. 4 embodiment. For example, if the SnCuBi oxide is used for layer 13 in the FIG. 4 embodiment, $SnO_2$, SnZnO, or other suitable dielectric material may be used for layer 23. In certain example embodiments, when SnCuBi oxide is used in or for one or more of layers 13, 15, 23, 40, the layer preferably contains more substantially more Sn than Cu and Bi; with an example being that the metal content of the layer is from about 30-97% Sn (more preferably from about 45-95%, even more preferably from about 60-95%, even more preferably from about 80-95% Sn), from about 0.1-20% Cu (more preferably from about 0.1-10%, even more preferably from about 1-8%, even more preferably from about 2-7% Cu), and from about 0.1-20% Bi (more preferably from about 0.5-15%, more preferably from about 1-10%, and most preferably from about 2-8% Bi). An example is SnCuBi oxide, where the metal content is about 91% Sn, about 4.5% Cu, and about 4.5% Bi. Of course, small amounts of other materials may also be included in the layer(s). In other embodiments of this invention, this tin oxide inclusive material with additional metals Cu and Bi may be used for any of the tin oxide based dielectric layers in any coating in any of U.S. Pat. Nos. 7,521,096, 7,879,448, 8,142,622, 7,648,769, 8,017,243, 7,597,965, or 7,858,191.

Referring to FIGS. 1-4, one or more of dielectric layers 13, 15, 23, 40 may be of or include an oxide of SnZnBiIn in certain example embodiments of this invention, where the layer(s) is substantially transparent and fully or substantially fully oxided. For example, the SnZnBiIn oxide material may be used for only layer 15 in the FIG. 1-2 embodiments, with essentially $SnO_2$ or other suitable dielectric material being used for layers 13 and 23. Alternatively, for example, the SnZnBiIn oxide material may be used for two or all three of layers 13, 15, and 23 in the FIG. 1 embodiment. As another example, the SnZnBiIn oxide material may be used for one or both of layers 40 and/or 13 in the FIG. 3 embodiment, and may be used for one or both of layers 13 and/or 23 in the FIG. 4 embodiment. For example, if the SnZnBiIn oxide is used for layer 13 in the FIG. 4 embodiment, $SnO_2$, SnZnO, or other suitable dielectric material may be used for layer 23. In certain example embodiments, when SnZnBiIn oxide is used in or for one or more of layers 13, 15, 23, 40, the layer preferably contains more substantially more Sn than Zn, Bi, and In; with an example being that the metal content of the layer is from about 30-95% Sn (more preferably from about 40-95%, even more preferably from about 70-93%, even more preferably from about 75-91% Sn), from about 1-50% Zn (more preferably from about 1-30%, even more preferably from about 2-15%, even more preferably from about 3-10% Zn), from about 0.5-20% Bi (more preferably from about 0.5-15%, more preferably from about 1-10%, and most preferably from about 2-7% Bi), and from about 0.1-20% In (more preferably from about 0.1-15%, more preferably from about 0.1-6%, and most preferably from about 2-7% In). An example is SnBiZnIn oxide, where the metal content is about 86.5% Sn, about 5.5% Zn, about 3.5% Bi, and about 4.5% In. Of course, small amounts of other materials may also be included in the layer(s). In other embodiments of this invention, this tin oxide inclusive material with additional metals Zn, Bi and In may be used for any of the tin oxide based dielectric layers in any coating in any of U.S. Pat. Nos. 7,521,096, 7,879,448, 8,142,622, 7,648,769, 8,017,243, 7,597,965, or 7,858,191.

Other layer(s) below or above the illustrated coatings may also be provided. Thus, while the layer system or coating is "on" or "supported by" substrate 1 (directly or indirectly), other layer(s) may be provided therebetween. Thus, for example, the coatings of FIGS. 1-4 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 1-2 embodiments are as follows, from the glass substrate outwardly (note that one or more of the tin oxide+M layers below may be any of the materials described above where the dielectric layer is of or including tin oxide with a additional metal(s), or alternatively may be of just tin oxide):

|  | Example Materials/Thicknesses | | |
|---|---|---|---|
| Layer<br>Glass (1-10 mm thick) | Preferred Range (Å) | More Preferred (Å) | Example (Å) |
| $Si_xN_y$ (layer 3) | 40-450 Å | 70-300 Å | 186 Å |
| $ZnO_x$ (layer 7) | 10-300 Å | 40-150 Å | 107 Å |
| Ag (layer 9) | 50-250 Å | 80-120 Å | 107 Å |
| $NiCrO_x$ (layer 11) | 10-100 Å | 12-40 Å | 30 Å |
| $SnO_2$ + M (layer 13) | 0-1,000 Å | 200-700 Å | 412 Å |
| $Si_xN_y$ (layer 14) | 50-450 Å | 80-200 Å | 131 Å |
| $SnO_2$ + M (layer 15) | 30-250 Å | 50-200 Å | 108 Å |
| $ZnO_x$ (layer 17) | 10-300 Å | 40-150 Å | 119 Å |
| Ag (layer 19) | 50-250 Å | 80-220 Å | 103 Å |
| $NiCrO_x$ (layer 21) | 10-100 Å | 20-45 Å | 33 Å |
| $SnO_2$ + M (layer 23) | 0-750 Å | 40-400 Å | 337 Å |
| $Si_3N_4$ (layer 25) | 10-750 Å | 20-100 Å | 53 Å |
| $ZrO_x$ (layer 27) | 0-200 Å | 10-50 Å | 22 Å |

In certain example embodiments of this invention, there is provided a coated article including a low-E coating on a glass substrate, the coating comprising: a first dielectric layer; first and second IR reflecting layers on the glass substrate and located over at least the first dielectric layer; and a second dielectric layer located between at least the first and second IR reflecting layers, wherein the second dielectric layer (e.g., see 13 and/or 15 in the figures) comprises an oxide of one or more of: SnPd, SnAg, SnMg, SnSb, SnZnBi, SnInZn, SnZnSb, SnZnAl, SnZnMg, SnCuSb, SnCuBi, SnBi, SnW, SnSbBi, SnZnCu, SnZnBiIn, and SnInGa. The second dielectric layer may be fully or substantially fully oxided. The coating may have, in certain example instances, two or three IR reflecting layers (e.g., of or including silver).

In the coated article of the immediately preceding paragraph, the first and second IR reflecting layers may be of or include silver.

In the coated article of any of the preceding two paragraphs, the first dielectric layer may comprise zinc oxide and may be located between the glass substrate and the first IR reflecting layer, and the first dielectric layer comprising zinc oxide may directly contact the first IR reflecting layer.

In the coated article of any of the preceding three paragraphs, the coating may further comprise a layer comprising silicon nitride between the glass substrate and the first IR reflecting layer.

In the coated article of any of the preceding four paragraphs, the coating may further comprise a third dielectric layer located between at least the first and second IR reflecting layers, wherein the second and third dielectric layers are separated from one another via at least a fourth dielectric layer, and wherein the third dielectric layer may comprise an oxide of one or more of: SnPd, SnAg, SnMg, SnSb, SnZnBi, SnInZn, SnZnSb, SnZnAl, SnZnMg, SnCuSb, SnCuBi, SnBi, SnW, SnSbBi, SnZnCu, SnZnBiIn, and SnInGa. The fourth dielectric layer may comprise silicon nitride. The coating may further comprise another layer comprising zinc oxide that is under and directly contacts said second IR reflecting layer.

The coated article of any of the preceding five paragraphs may have a visible transmission of at least 30%, more preferably of at least about 30%, even more preferably of at least about 50% or 60%.

In the coated article of any of the preceding six paragraphs, the coating may have a sheet resistance of no greater than 5 ohms/square.

The coated article of any of the preceding seven paragraphs may be heat treated (e.g., thermally tempered). The coated article may have a glass side reflective $\Delta E^*$ value of no greater than 5.0 (more preferably no greater than 4.5 or 4.0) due to the heat treatment.

In the coated article of any of the preceding eight paragraphs, the second dielectric layer may comprise or consist essentially of an oxide of SnPd. The metal content of the second dielectric layer may comprise from about 70-99% Sn and from about 1-20% Pd. In the coated article of any of the preceding eight paragraphs, the second dielectric layer may comprise or consist essentially of an oxide of SnAg. The metal content of the second dielectric layer may comprises from about 75-99% Sn and from about 1-10% Ag. In the coated article of any of the preceding eight paragraphs, the second dielectric layer may comprise or consist essentially of an oxide of SnMg. The metal content of the second dielectric layer may comprise from about 70-99% Sn and from about 1-20% Mg. In the coated article of any of the preceding eight paragraphs, the second dielectric layer may comprise or consist essentially of an oxide of SnSb. The metal content of the second dielectric layer may comprise from about 75-99% Sn and from about 1-20% Sb. In the coated article of any of the preceding eight paragraphs, the second dielectric layer may comprise of consist essentially of an oxide of SnZnBi. The metal content of the second dielectric layer may comprise from about 20-60% Sn, from about 30-70% Zn, and from about 2-20% Bi. In the coated article of any of the preceding eight paragraphs, the second dielectric layer may comprise or consist essentially of an oxide of SnInZn. The metal content of the second dielectric layer may comprise from about 20-60% Sn, from about 30-70% In, and from about 1-20% Zn. In the coated article of any of the preceding eight paragraphs, the second dielectric layer may comprise or consist essentially of an oxide of SnZnSb. The metal content of the second dielectric layer may comprise from about 10-55% Sn, from about 30-70% Zn, and from about 5-40% Sb. In the coated article of any of the preceding eight paragraphs, the second dielectric layer may comprise or consist essentially of an oxide of SnZnAl. The metal content of the second dielectric layer may comprise from about 40-93% Sn, from about 2-35% Zn, and from about 1-15% Al. In the coated article of any of the preceding eight paragraphs, the second dielectric layer may comprise or consist essentially of an oxide of SnZnMg. In the coated article of any of the preceding eight paragraphs, the second dielectric layer may comprise or consist essentially of an oxide of SnCuSb. In the coated article of any of the preceding eight paragraphs, the second dielectric layer may comprise or consist essentially of an oxide of SnCuBi. In the coated article of any of the preceding eight paragraphs, the second dielectric layer may comprise or consist essentially of an oxide of SnZnBiIn. Different dielectric layers of the coating may be of various ones of these materials in certain example embodiments of this invention.

In the coated article of any of the preceding nine paragraphs, the second dielectric layer may comprise or consist essentially of an oxide of one or more of: SnPd, SnAg, SnInZn, SnCuSb, SnCuBi, SnW, SnZnCu, SnZnBiIn, and SnInGa.

In the coated article of any of the preceding ten paragraphs, the second dielectric layer may comprise or consist essentially of an oxide of a binary alloy.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a low-E coating on a glass substrate, the coating comprising:
   a first dielectric layer;
   first and second IR reflecting layers on the glass substrate and located over at least the first dielectric layer;
   a second dielectric layer located between at least the first and second IR reflecting layers, wherein the second dielectric layer comprises an oxide of SnPd and optionally one or more of: SnAg, SnMg, SnSb, SnZnBi, SnInZn, SnZnSb, SnZnAl, SnZnMg, SnCuSb, SnCuBi, SnBi, SnW, SnSbBi, SnZnCu, SnZnBiIn, and SnInGa; and
   a third dielectric layer located between at least the first and second IR reflecting layers, wherein the second and third dielectric layers are separated from one another via at least a fourth dielectric layer, and wherein the third dielectric layer comprises an oxide of SnPd and optionally one or more of: SnAg, SnMg, SnSb, SnZnBi, SnInZn, SnZnSb, SnZnAl, SnZnMg, SnCuSb, SnCuBi, SnBi, SnW, SnSbBi, SnZnCu, SnZnBiIn, and SnInGa.

2. The coated article of claim 1, wherein the first and second IR reflecting layers comprise silver.

3. The coated article of claim 1, wherein the first dielectric layer comprises zinc oxide and is located between the glass substrate and the first IR reflecting layer, and wherein the first dielectric layer comprising zinc oxide directly contacts the first IR reflecting layer.

4. The coated article of claim 1, wherein the coating further comprises a layer comprising silicon nitride between the glass substrate and the first IR reflecting layer.

5. The coated article of claim 1, wherein the fourth dielectric layer comprises silicon nitride.

6. The coated article of claim 1, wherein the coating further comprises another layer comprising zinc oxide that is under and directly contacts said second IR reflecting layer.

7. The coated article of claim 1, wherein the coated article has a visible transmission of at least 30%, and wherein the dielectric layer is substantially fully oxided and/or fully oxided.

8. The coated article of claim 1, wherein the coated article has a visible transmission of at least 50%.

9. The coated article of claim 1, wherein the coating has a sheet resistance of no greater than 5 ohms/square.

10. The coated article of claim 1, wherein the coated article is heat treated.

11. The coated article of claim 1, wherein the coated article is heat treated and has a glass side reflective $\Delta E^*$ value of no greater than 5.0 due to the heat treatment.

12. The coated article of claim 1, wherein a metal content of the second dielectric layer comprises from about 70-99% Sn and from about 1-20% Pd.

13. The coated article of claim 1, wherein the second dielectric layer consists essentially of an oxide of SnPd.

14. The coated article of claim 1, wherein the second dielectric layer comprises an oxide of SnAg.

15. The coated article of claim 1, wherein the second dielectric layer comprises an oxide of SnMg.

16. The coated article of claim 1, wherein the second dielectric layer comprises an oxide of SnSb.

17. The coated article of claim 1, wherein the second dielectric layer comprises an oxide of SnZnBi.

18. The coated article of claim 1, wherein the second dielectric layer comprises an oxide of SnInZn.

19. The coated article of claim 1, wherein the second dielectric layer comprises an oxide of SnZnSb.

20. The coated article of claim 1, wherein the second dielectric layer comprises an oxide of SnZnAl.

21. The coated article of claim 1, wherein the second dielectric layer comprises an oxide of SnZnMg.

22. The coated article of claim 1, wherein the second dielectric layer comprises an oxide of SnCuSb.

23. The coated article of claim 1, wherein the second dielectric layer comprises an oxide of SnCuBi.

24. The coated article of claim 1, wherein the second dielectric layer comprises an oxide of SnZnBiIn.

25. The coated article of claim 1, wherein the second dielectric layer consists essentially of an oxide of a binary alloy.

26. The coated article of claim 1, wherein the second dielectric layer comprises an oxide of SnPd and optionally one or more of: SnAg, SnInZn, SnCuSb, SnCuBi, SnW, SnZnCu, SnZnBiIn, and SnInGa.

27. A coated article including a low-E coating on a glass substrate, the coating comprising:
- a first dielectric layer;
- first and second IR reflecting layers on the glass substrate and located over at least the first dielectric layer;
- a second dielectric layer located between at least the first and second IR reflecting layers, wherein the second dielectric layer comprises an oxide of SnPd; and
- a third dielectric layer located between at least the first and second IR reflecting layers, wherein the second and third dielectric layers are separated from one another via at least a fourth dielectric layer, and wherein the third dielectric layer comprises an oxide of Sn Pd.

28. The coated article of claim 27, wherein a metal content of the dielectric layer comprises from about 70-99% Sn and from about 1-20% Pd.

* * * * *